United States Patent

Sigsbee et al.

[15] 3,693,003

[45] Sept. 19, 1972

[54] STORAGE TARGET FOR AN ELECTRON-BEAM ADDRESSED READ, WRITE AND ERASE MEMORY

[72] Inventors: Raymond A. Sigsbee; Ronald H. Wilson, both of Schenectady, N.Y.

[73] Assignee: General Electric Company

[22] Filed: Nov. 19, 1970

[21] Appl. No.: 91,053

[52] U.S. Cl. ...............313/68 R, 313/66, 317/235 B, 317/235 N, 340/173 LS, 340/173 CR, 313/65 AB

[51] Int. Cl..........G11c 7/00, G11c 11/36, H01j 1/78

[58] Field of Search.340/173 LS, 173 CR; 317/235B, 317/235 N; 313/66, 65 AB, 68 R

[56] References Cited

UNITED STATES PATENTS

| | | | |
|---|---|---|---|
| 3,439,214 | 4/1969 | Kabell | 317/235 B |
| 3,564,309 | 2/1971 | Hoeberechts | 317/235 N |
| 3,577,047 | 5/1971 | Cheroff | 317/235 B |
| 3,528,064 | 9/1970 | Everhart | 340/173 LS |

*Primary Examiner*—Bernard Konick
*Assistant Examiner*—Stuart Hecker
*Attorney*—Richard R. Brainard, Paul A. Frank, Charles T. Watts, Paul F. Wille, Frank L. Neuhauser, Oscar B. Waddell and Joseph B. Forman

[57] ABSTRACT

A storage target for a read, write and erase memory is disclosed utilizing a semiconductor memory storage element. The storage of information relies on charge storage to create or pinch off a conductive channel between an internal conductive electrode and isolated diode junctions. An electron beam, irradiating each storage area, is used for reading, writing and erasing.

10 Claims, 5 Drawing Figures

INVENTORS:
RAYMOND A. SIGSBEE,
RONALD H. WILSON,
by Paul F. Wille
THEIR ATTORNEY

INVENTORS:
RAYMOND A. SIGSBEE;
RONALD H. WILSON, by Paul F. Wille
THEIR ATTORNEY

STORAGE TARGET FOR AN ELECTRON-BEAM ADDRESSED READ, WRITE AND ERASE MEMORY

THE DISCLOSURE

This invention relates to an information storage system and, in particular, to a target for an electron beam addressed read, write and erase memory.

In the continuous development of computer memories, several approaches have been taken in providing an information storage system that has a large capacity, small size and is economical to fabricate and use. Dividing memories into magnetic and electrostatic categories, one approach taken in the electrostatic area utilizes an electron beam generating and deflecting means and a target.

The use of an electron beam provides a random access memory in which data may be read in, read out, or erased at high rates since the electron beam can be moved virtually instantaneously. Further, by using an electron beam, high data storage densities are made possible. This latter feature placed the burden on electron beam advocates of finding a suitable, high resolution target.

Generally speaking, the desirable requirements of a target in an electron beam data storage system are the ability to utilize the electron beam for all functions, read, write and erase, and high density storage.

Previously proposed targets include photographic film and capacitor structures. Photographic film, in addition to being non-erasable, requires development after exposure to the information to be stored and presents some re-registration difficulties after removal for development.

Capacitor memories, in which a hole in the dielectric is made by the electron beam, are also non-erasable. Further, problems are also encountered with hole uniformity and read/write discrimination.

Semiconductor charge storage targets have been proposed, such as exemplified by the recent U.S. Pat. by Everhart et al., No. 3,528,064. This storage target utilizes a plurality of MOSFET's whose gates are partially irradiated by an electron beam. Such a target has several deficiencies, not the least of which are the fact that each electrode of each FET requires its own access lead and the fact that the circuit draws power when charge is stored.

In view of the foregoing, it is therefore an object of the present invention to provide a high storage density target.

A further object of the present invention is to provide a high storage density target in a memory system utilizing an electron beam for reading, writing and erasing.

Another object of the present invention is to provide an information storage target utilizing an inversion layer to couple a p-n junction to a conductive contact.

A further object of the present invention is to provide an erasable semiconductor memory having automatic registration of p-n junctions in the elements of the array.

Another object of the present invention is to provide an information storage target having common access leads.

A further object of the present invention is to provide an information storage target in which an electron beam acts as one access lead.

The foregoing objects are achieved in the present invention wherein there is provided a semiconductor structure comprising a semiconductive substrate of a first conductivity type having a plurality of pairs of regions diffused therein; a conductive region forming a conductive contact and a region of a second conductivity type forming a p-n junction, spaced from the first region and isolated therefrom by said substrate. Insulating and conducting layers are applied to the substrate and then etched to form a plurality of storage areas containing said pairs of regions.

In operation, an electron beam irradiates the storage area, penetrating the insulating layer and forming a charged region in the insulator. This charge causes an inversion layer thereunder in the semiconductor substrate. The inversion layer thus formed couples the diffused region to the conductive region. This can be considered as the storage of a logic "1." During readout, the electron beam irradiates the p-n junction. Since the diffused region is now coupled to the conductive region by the inversion layer, a current flow in the conductive layer indicates the presence of stored charge or a logic "1." Obviously, either the presence or absence of charge can be taken as an indication of the information stored.

A more detailed understanding of the present invention may be obtained by considering the following detailed description in conjunction with the accompanying drawings in which.

Figure 1:
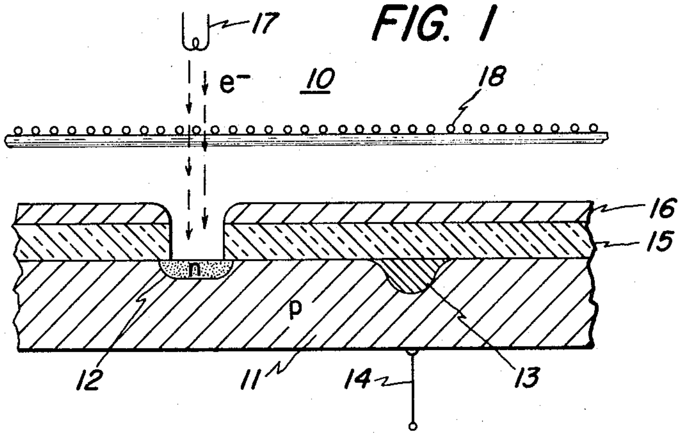
FIG. 1 illustrates a single semiconductor memory storage area in accordance with the present invention.

Referring to FIG. 1, there is illustrated a single storage area or site 10 in accordance with the present invention. Storage site 10 comprises a semiconductor layer 11 of a first type conductivity having diffused therein a semiconductive region 12 of a second type conductivity and a conductive region 13 also diffused therein. As illustrated in FIG. 1, semiconductor layer 11 may comprise a p-type semiconductor and diffused region 12 may comprise n-type semiconductor thereby forming a p-n junction isolated from conductive region 13 by the remainder of semiconductor layer 11.

Deposited over semiconductor layer 11 is an insulating layer 15 having deposited thereon a conductive layer 16. Layers 15 and 16 have portions thereof removed by etching or other suitable techniques to provide an aperture above the p-n junction formed by layer 11 and diffused region 12. Semiconductor layer 11 has an external electrode 14 coupled thereto and is irradiated by an electron beam generated from source 17. Intermediate to source 17 and storage medium 10 is grid 18 which serves to control the potential of the surface of storage site 10.

While FIG. 1 illustrates source 17 as directing electrons toward p-n junction 11–12, in practice the electron beam can be directed at the entire storage site, i.e. the region comprising semiconductive layer 11 regions 12 and 13 and the overlying layers 15 and 16. In fabricating a storage target in accordance with the present invention, insulator layer 15 and conductive layer 16 may be conveniently applied before the fabrication of diffused region 12. Then, a portion of layers 15 and 16 may be simultaneously etched away and the diffusion process carried out to form diffused region 12 in a self-registering fashion. Conductive region 13 can be formed by many methods, such as a high doping level of copper or gold, preferably gold, in that region. Insulating layer 15 can be formed as an oxide of semiconductive layer 11.

Figure 2:
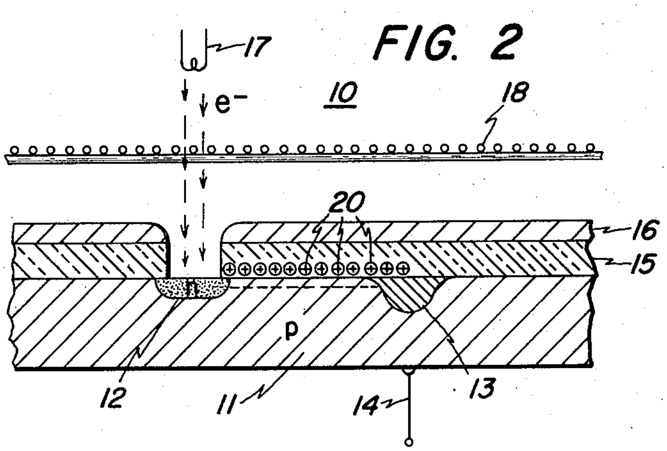
FIG. 2 illustrates the storage of information in the storage area.

The overall operation of the present invention may best be understood by considering FIG. 2 in which there is illustrated a storage target containing stored charge in accordance with the present invention.

Referring to FIG. 2, in which elements common to FIGS. 1 and 2 have the same reference numeral, storage area 10 is radiated with an electron beam from source 17 while conductive layer 16, which extends over a number of storage sites, is positively biased with respect to semiconductive layer 11. The electron beam from source 17 is used to select the storage site and is of sufficient energy to penetrate through conductive layer 16 to insulating layer 15. This creates some mobile electrons in the insulating or oxide layer. As these electrons are collected at conductive layer 16, the immobile positive charge represented by elements 20 is trapped in the insulating layer. After a sufficient charge is accumulated, the positive charge of the insulated layer will induce an inversion in semiconductive layer 11, which has been assumed to be p-type semiconductor. This inversion layer extends underneath the insulating layer and couples diffused region 12 to conductive region 13. This process then is the writing function in which information is stored in storage area 10.

In order to read out the memory in accordance with the present invention, storage area 10 is again selected by and irradiated with an electron beam from source 17, but without a potential applied to conductive layer 16. By virtue of the inversion layer formed under insulator 15, a current formed by the electron beam can flow by way of diffused region 12 to conductive region 13 and be read out as an output signal by way of external electrode 14. Since the storage of charge may be taken as a logic "1" or a logic "0" the presence or absence of charge accumulated on insulating layer 15 will determine whether or not the current developed by the electron beam is sensed at external electrode 14. If no charge, or insufficient charge to cause an inversion layer in p-type semiconductive layer 11 is stored in insulator 15, then diffused region 12 is isolated from conductive region 13 and only a minute current will flow to external electrode 14.

Erasing the storage areas in accordance with the present invention is similar to the writing procedure except that conductive layer 16 is negatively biased instead of being positively biased as was the case in writing. For erasure, a storage area 10 is radiated by an electron beam from source 17 while conductive layer 16 is negatively biased. This replaces the electrons previously drawn off from insulating layer 15 and erases the inversion layer formed thereunder. The irradiation of storage area 10 during erasure should not be critical since a storage of negative charge has not been observed.

The creation of a conducting channel in semiconductor layer 11 can be applied to the case of *p* contacts in an n-type semiconductor when suitable potentials are applied to grid 18, conductive layer 16, and semiconductive layer 11. For semiconductor structures having a conducting channel normally open from the diode to the conductive contact, the conducting channel can be pinched off by charge storage in insulating layer 15. In any case, the presence or absence of a conducting channel is an indication of information stored. During the reading operation, it is not necessary to irradiate the whole storage site with the high energy electron beam utilized for writing and erasing. Thus, the potential on source 17 may be suitably modified so that the electron beam will not penetrate conductive layer 16 and only irradiate diffused region 12.

Figure 3:
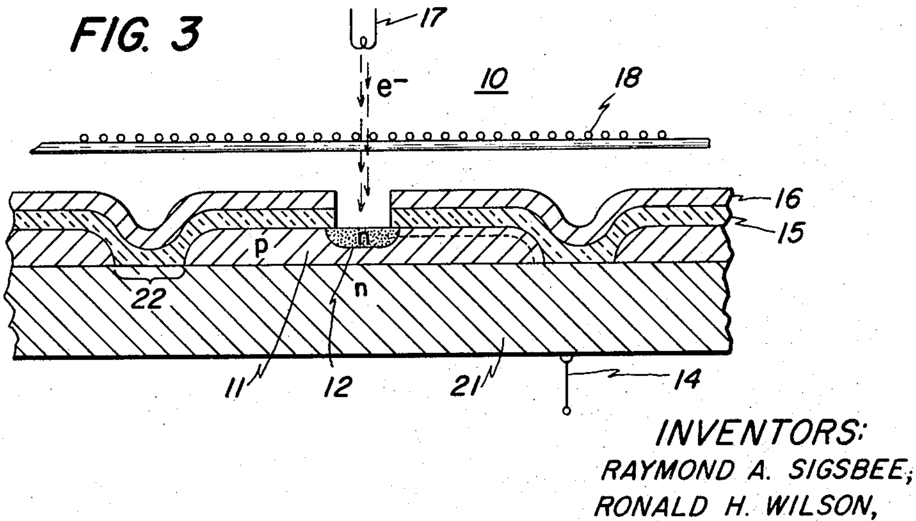
FIG. 3 illustrates an alternative construction of the storage area.

FIG. 3 illustrates an alternative embodiment of the present invention wherein a conductive region as such is not utilized. Instead the memory area is fabricated in a different fashion to provide the functions achieved by the memory cell illustrated in FIGS. 1 and 2. In the embodiment illustrated in FIG. 3 a substrate 21 herein illustrated as comprising n-type semiconductive material has an epitaxial *p* layer thereon. A region 22 is etched through the epitaxial *p* layer and metal and oxide layers 16 and 15 are applied as before. An area adjacent to etched region 22 is etched through the metal and oxide layers and an n-type semiconductive region 12 is formed by diffusion.

The overall operation of the memory cell illustrated in FIG. 3 is similar to that described in connection with the memory cell of FIG. 2. To write, a positive potential is applied to metal layer 16 and the storage site is irradiated by an electron beam from source 17. The induced inversion layer under insulating layer 15 couples diffused region 12 to semiconductive layer 21 and, hence, to external electrode 14. For reading, no potential is applied to metal layer 16 and the storage site, or diffused region 12, is irradiated by the electron beam. External electrode 14 is monitored to determine if the inversion layer exists. For erasing, a negative potential is applied to metal layer 16 and the storage site is irradiated by the electron beam from source 17 to erase the inversion layer.

Figure 4:
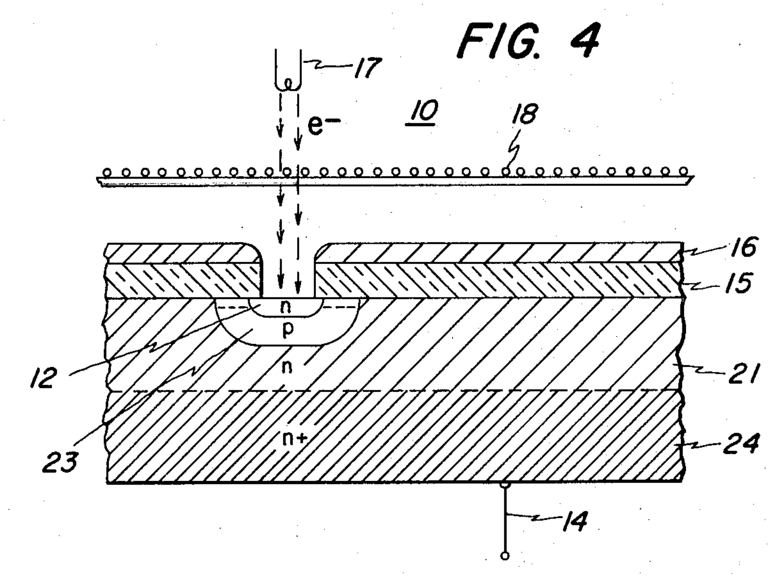
FIG. 4 illustrates another construction of the storage area.

FIG. 4 illustrates yet another embodiment of the present invention utilizing double diffusion techniques to achieve the isolated diode/charge storage memory in accordance with the present invention. Oxide and metal layers 15 and 16, respectively, may be formed on semiconductive layer 21 by any suitable means. A region is etched away from the metal and oxide layers forming a hole through which the diffusion steps can take place. A first, deep diffusion produces conductivity region 23 which is opposite in type to that of semiconductive layer 21. In the example illustrated in FIG. 4, semiconductive layer 21 is considered n-type semiconductor. The first, deep diffused region 23 is p-type semiconductor. A second diffusion is then made producing n-type conductivity region 12. A more heavily doped layer 24, designated $n^+$ can be added if desired to semiconductive layer 21 to provide a reduced impedance.

In its overall operation, the memory area illustrated in FIG. 4 operates in a similar fashion to that of the other embodiments. Irradiation of storage area 10 by an electron beam will produce an inversion layer in deep diffused region 23, thereby connecting second diffused region 12 to semiconductive layer 21. Again, the presence or absence of charge is indicative of the information stored. If a charge has been stored in insulating layer 15, then the irradiation of a storage area 10 by an electron beam during readout will produce a current in external electrode 14.

Figure 5:
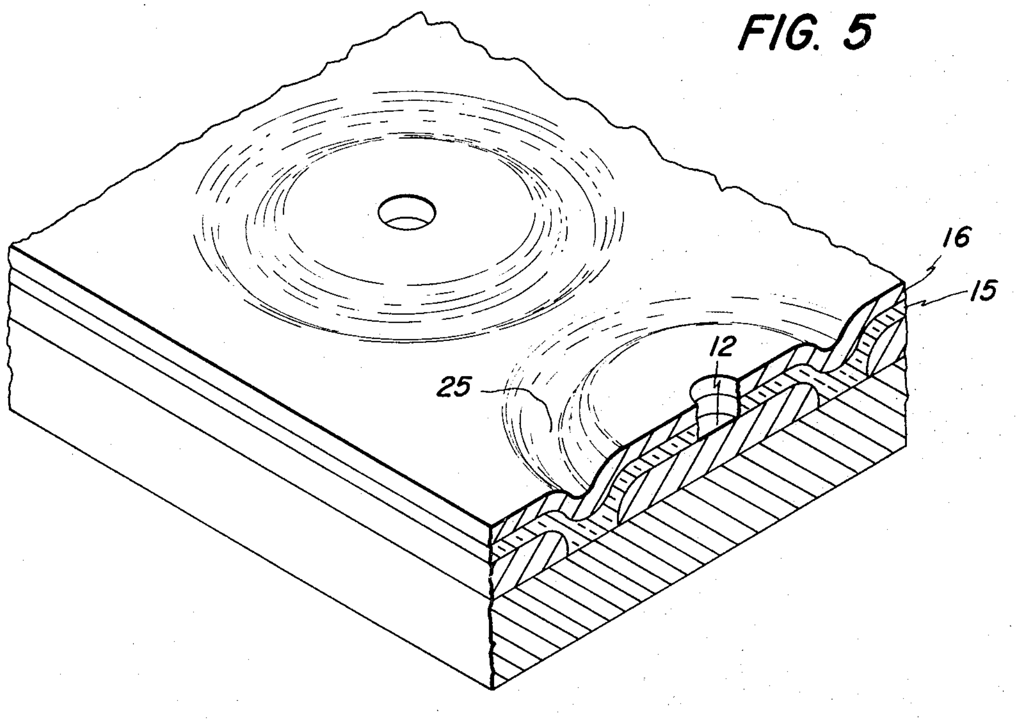
FIG. 5 illustrates one configuration of storage areas.

FIG. 5 illustrates a perspective view of several storage areas in accordance with the present invention. A plurality of diffused regions 12 are shown as exposed to the electron beam by a plurality of circular holes in the overlying metal and insulating layers 16 and 15 respectively. An annular depressed area 25 is illustrated as surrounding the hole over diffused region 12. This depressed area overlies etched away region 22 as shown in FIG. 3. If the embodiment of FIG. 1 were similarly drawn, no depressed area would show, but conductive region 13 would surround diffused region 12 in a similar, annular fashion.

Having thus described the invention, it will be apparent to those skilled in the art that many modifications may be made within the spirit and scope of the present invention. For example, while described in particular with respect to n-type region diffused into a p-type layer, it should be understood that, with suitable changes in bias level, opposite conductivity type material may be utilized. Further, while the storage areas have been illustrated as circular in FIG. 5, it should be obvious that a grid matrix type of arrangement with noncircular storage areas could equally well be utilized.

What I claim as new and desire to secure by Letters Patent of the Unites States is:

1. A storage target comprising:
- a layer of semiconductive material of a first conductivity type;
- a plurality of pairs of diffused regions forming storage areas in said semiconductive layer, each of said pairs comprising: a semiconductive region, of opposite conductivity from said layer, and a conductive region spaced therefrom;
- an insulating layer overlying all but said opposite conductivity regions in said semiconductive layer; and
- a conductive layer, overlying said insulating layer and in registry therewith, for inducing charge storage in said insulating layer; said induced charge producing an inversion in said semiconductive layer which electrically couples said semiconductive and conductive regions together.

2. A storage target as set forth in claim 1 wherein said semiconductive layer comprises p-type semiconductive material and said semiconductive diffused region comprises n-type material.

3. An information storage system comprising:
- source means providing an electron beam for reading, writing and erasing information;
- a storage target for said electron beam, said storage target comprising:
- a semiconductive layer having a plurality of storage sites, each storage site including a pair of diffused regions spaced apart on said semiconducting layer; one of said diffused regions comprising semiconductive material of opposite conductivity type to that of said layer, the other of said regions comprising conductive material;
- an insulating layer overlying all of said semiconductive layer but said opposite conductivity diffused regions; and
- a conductive layer in registry with and overlying said insulating layer; said respective layers cooperating to store information under the control of said electron beam.

4. A storage target for an information storage system comprising:
- a semiconductive substrate of a first conductivity type;
- a layer of a second conductivity type semiconductor epitaxially grown on said substrate, said layer having a plurality of annular rings formed therein which expose said substrate along said ring;
- a plurality of diffused regions of said first conductivity type in said epitaxial layer, one for each of said annular rings;
- an insulating layer overlying all but said diffused regions; and
- a conductive layer, overlying said insulating layer and in registry therewith, for inducing charge storage in said insulating layer to produce an inversion in said epitaxial layer which electrically couples said diffused region to said substrate.

5. A storage target as set forth in claim 4 wherein said epitaxial layer comprises p-type material and said substrate comprises n-type material and said diffused regions comprise n-type material.

6. An information storage system comprising:
- source means providing an electron beam for reading, writing and erasing information;
- a storage target for said electron beam, said storage target comprising:
- a semiconductive substrate containing a plurality of sets of spaced apart p-n junctions and conductive regions;
- an insulating layer overlying all but the p-n junctions of said substrate; and
- a conductive layer overlying said insulating layer and therewith; said respective layers cooperating to store information in the form of an electric charge in said insulating layer under the control of said electron beam.

7. An information storage system comprising:
- source means for providing an electron beam for reading, writing and erasing information;
- a storage target for said electron beam, said storage target comprising:
- a semiconductor substrate of a first conductivity type;
- a plurality of deep diffused regions of semiconductor material of a second conductivity type;
- a region of said first type conductivity diffused into each of said second conductivity type of semiconductor material;
- an external electrode coupled to said substrate;
- an insulating layer overlying all of said substrate but said first type conductivity diffused regions; and
- a conductive layer overlying said insulating layer and in registry therewith; said electron beam inducing charge in said insulating layer to cause an inversion in said second conductivity type semiconductor region for coupling said first type conductivity diffused region to said substrate and said external electrode.

8. An information storage system as set forth in claim 7, wherein said first and second conductivity types comprise n- and p-type semiconductive materials respectively.

9. An information storage target comprising:

a semiconductive substrate;

an epitaxial layer overlying said substrate having a plurality of p-n junctions therein, said epitaxial layer having a plurality apertures formed therein adjacent said plurality of p-n junctions;

an insulating layer overlying all but said p-n junctions of said epitaxial layer; and a conductive layer overlying said insulating layer and in registry therewith.

10. An information storage target as set forth in claim 9, wherein said insulator comprises an oxide of said substrate material.

* * * * *